United States Patent [19]
Huppenthal

[11] Patent Number: 6,026,459
[45] Date of Patent: Feb. 15, 2000

[54] SYSTEM AND METHOD FOR DYNAMIC PRIORITY CONFLICT RESOLUTION IN A MULTI-PROCESSOR COMPUTER SYSTEM HAVING SHARED MEMORY RESOURCES

[75] Inventor: Jon M. Huppenthal, Colorado Springs, Colo.

[73] Assignee: SRC Computers, Inc., Colorado Springs, Colo.

[21] Appl. No.: 09/018,032

[22] Filed: Feb. 3, 1998

[51] Int. Cl.[7] .................................................. G06F 13/14
[52] U.S. Cl. .................................... 710/116; 710/107
[58] Field of Search .............................. 710/107, 113, 710/116, 241

[56] References Cited

U.S. PATENT DOCUMENTS

| | | | |
|---|---|---|---|
| 4,663,756 | 5/1987 | Retterath | 370/85 |
| 4,920,486 | 4/1990 | Nielsen | 364/200 |
| 4,953,081 | 8/1990 | Feal et al. | 364/200 |
| 5,392,436 | 2/1995 | Jansen et al. | 395/725 |
| 5,553,248 | 9/1996 | Melo et al. | 395/296 |
| 5,623,672 | 4/1997 | Popat | 395/728 |
| 5,748,969 | 5/1998 | Lee et al. | 395/732 |
| 5,842,025 | 11/1998 | Joffe | 395/728 |

*Primary Examiner*—Ayaz R. Sheikh
*Assistant Examiner*—Jigar Pancholi
*Attorney, Agent, or Firm*—William J. Kubida; Hogan & Hartson LLP

[57] ABSTRACT

A system and method for dynamic priority conflict resolution in a multi-processor computer system having shared memory resources wherein a predetermined priority level for each input port is maintained by each output port. When a conflict for a particular output port occurs, the priority levels of the conflicting inputs are evaluated and access is initially granted to the highest priority input. Once this initial access is granted, the priority level of the "winning" input is then changed to the lowest priority level and the priority of all of the other inputs is increased by one. Inputs not requiring access to a particular output port over a relatively long period of time will resultantly have their priority incremented to the highest level and remain there. If multiple inputs have been incremented to the highest priority, or another form of priority conflict occurs, the input may then default back to its original predetermined priority. In this instance, no input will be blocked indefinitely and the longest wait will then be equal to the time duration for which access is granted, multiplied by the total number of inputs.

14 Claims, 6 Drawing Sheets

SYSTEM AND METHOD FOR DYNAMIC PRIORITY CONFLICT RESOLUTION IN A MULTI-PROCESSOR COMPUTER SYSTEM HAVING SHARED MEMORY RESOURCES

CROSS REFERENCE TO RELATED PATENT APPLICATIONS

The present invention is related to the subject matter disclosed in U.S. patent applications Ser. No. 08/992,763 filed Dec. 17, 1997 for "Multiprocessor Computer Architecture Incorporating a Plurality of Memory Algorithm Processors in the Memory Subsystem" and Ser. No. 09/008,871 filed Jan. 20, 1998 for "Scalable Single System Image Operating Software Architecture for a Multi-Processing Computer System", both assigned to SRC Computers, Inc., Colorado Springs, Colo., assignee of the present invention, the disclosures of which are herein specifically incorporated by this reference.

BACKGROUND OF THE INVENTION

The present invention relates, in general, to the field of multi-processor computer systems. More particularly, the present invention relates to a system and method for dynamic priority conflict resolution in a multi-processor computer system, for example a symmetric multi-processing ("SMP") computer system, having shared memory resources.

SMP is defined as the connection of more than one homogeneous processor to a single, monolithic central memory. However, until recently, hardware and software limitations have minimized the total number of physical processors that could access a single memory efficiently. These limitations have reduced the ability to maintain computational efficiency as the number of processors in a computer system increased, thus reducing the overall scalability of the system. With the advent of faster and ever more inexpensive microprocessors, large processor count SMP systems are becoming available and hardware advances have allowed interconnected networks to multiplex hundreds of processors to a single memory with a minimal decrease in efficiency.

Nevertheless, in any computer system that employs multiple processors which share the same memory space, it is possible that at least two processors may try to access the same memory simultaneously. In this instance a "conflict" is said to exist. In addition to memory, conflicts may also arise for any single element in the system wherein multiple users may require substantially concurrent access. An example of this type of conflict might occur when a port on a crossbar switch is used to route incoming signals from multiple ports to a selected output port; also a situation requiring conflict resolution. To resolve such conflicts, special circuitry must be added to the computer system in order to determine which device is allowed to access memory or another system resource at any given time.

The simplest of these circuits merely assigns a predetermined priority value to each of the processors in the system, when a conflict occurs, the circuit grants access to the highest priority processor. Any other processor must try to access memory at a later time, which causes it to be delayed. Although this circuit is easy to implement, it has a major drawback. It is possible for a single, high-priority processor to continually access the resource and prevent lower priority processors from ever getting access to it. This event will stall out the other processors and greatly reduce system performance. Also, as the number of processors increase, so will the likelihood of this event happening. As a result, it has been very difficult to build shared memory computers with hundreds of processors and still have the performance of that system scale well beyond 64 processors.

SUMMARY OF THE INVENTION

The system and method of the present invention advantageously overcomes this memory access priority problem and is of especial utility in affording equal priority access to the shared memory resources by all processing devices. In a particular embodiment disclosed herein, a circuit for effectuating the same may be implemented utilizing Field Programmable Gate Array ("FPGA") technology.

The function of the circuit disclosed to implement the system and method of the present invention is to resolve conflicts within a crossbar switch used to connect the processors to the shared memory in a computer system. The particular embodiment disclosed includes a switch with a first plurality of input ports (e.g. 20) and a second plurality of output ports (e.g. 16). A number of these switches are then cascaded into two levels to allow a total of 320 processors to access any of up to 256 memory banks. As stated previously, in a computer system utilizing this relatively large number of processors, it is necessary to ensure that all processors have equal priority to access memory over time.

In operation, a priority level for each input port is maintained by each output port. On power up, these priority levels are predetermined in accordance with the particular computer system design. When a conflict for a particular output port occurs, the priority levels of the conflicting inputs are evaluated and access is initially granted to the highest priority input. Once this initial access is granted, the priority level of the "winning" input is then changed to the lowest priority level and the priority of all of the other inputs is increased by one.

Through use of this technique, all inputs will transition through all of the possible priority levels based upon their usage of the output and an input that has just been given access to the output will have a low priority, whereas an input that has not recently accessed the output will have a higher priority. Inasmuch as only those inputs that require access to the output are evaluated, the system always allows a useful connection. In addition, the input that has least recently used the output will be allowed access to it.

Since it is possible that an input may not need access to a particular output port for some time, this will result in its priority being incremented to the highest level, where it will remain. In the particular implementation disclosed, this highest level priority is the only priority level that can legitimately be held by more than one input at a time. As a consequence, a mechanism is needed to deal with a conflict between inputs that all have the highest priority level, although this same situation might also be encountered in the event of a circuit error that inappropriately assigned the same priority to two differing inputs.

The solution disclosed herein is to then default back to the original predetermined priorities when a priority conflict occurs. This action breaks the tie and allows the circuit to continue to function as described. This, in essence, guarantees that no input will be blocked indefinitely and that the longest wait will be equal to the time duration for which access is granted, multiplied by the total number of inputs.

Specifically, what has been disclosed herein is a computer system including a plurality of processing elements requiring access to a shared memory resource. The computer system comprises a priority conflict resolution circuit for controlling access to the memory resource among the processing elements. The priority conflict resolution circuit includes a predetermined differing initial priority assigned corresponding to each of the plurality of the processing elements. Upon a selected one of the processing elements being afforded access to the memory resource based upon its initial priority being a highest priority, the initial priority of that processing element is then changed to a lowest priority and the priority of all others of the plurality of the processing elements is incremented to a next higher priority.

Also disclosed herein is a method for dynamic priority conflict resolution in a computer system which includes a plurality of processing elements and a shared memory resource. The method comprises the steps of assigning a predetermined differing initial priority corresponding to each of the plurality of processing elements; affording access to the memory resource to a requesting one of the processing elements having a highest initial priority thereof; reducing the initial priority of the processing element afforded access to the memory resource to a lowest priority thereof and incrementing the priority of each remaining one of the plurality of processing elements to a next higher priority.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DESCRIPTION OF A PREFERRED EMBODIMENT

Figure 1A:
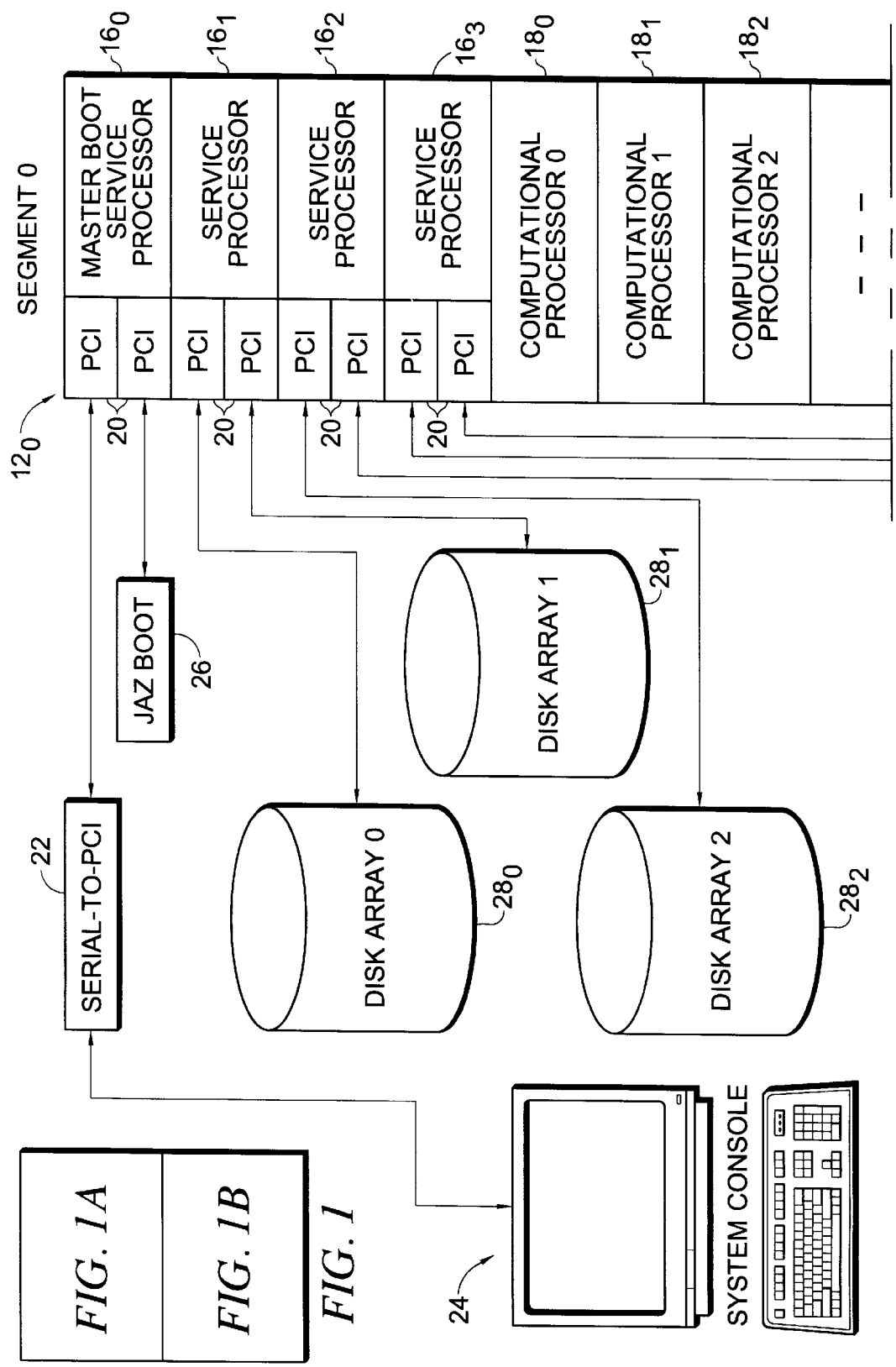
FIGS. 1A and 1B are a functional block system overview illustrating a computer system in accordance with an embodiment of the present invention comprising between 1 and 16 segments coupled together by a like number of trunk lines, each segment containing a number of computational and service processors in addition to memory and a crossbar switch assembly.
Figure 1B:
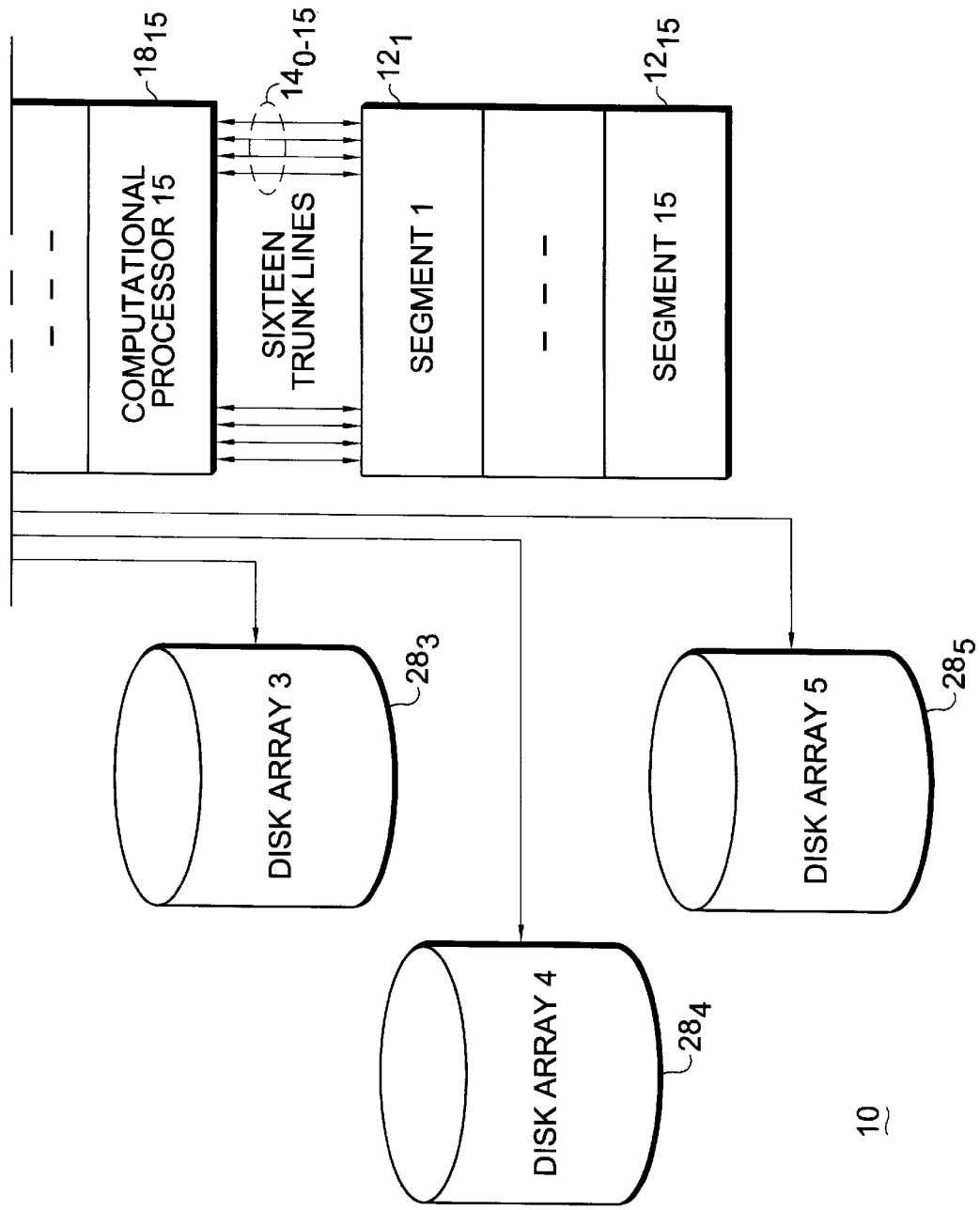

With reference now to FIGS. 1A and 1B, a symmetric multi-processing computer system 10 in accordance with the present invention is shown. The exemplary computer system 10 comprises, in pertinent part, any number of interconnected segments $12_0$ through $12_{15}$, although the principles of the present invention are likewise applicable to any scalable system having large numbers of processors. The various segments $12_0$ through $12_{15}$ are coupled through a number of trunk lines $14_0$ through $12_{15}$ as will be more fully described hereinafter.

Each of the segments 12 comprises a number of functionally differentiated processing elements in the form of service processors $16_0$ through $16_3$ (service processor $16_0$ functions additionally as a master boot device) and computational processors $18_0$ through $18_{15}$. The service processors 16 are coupled to a number of peripheral component interconnect ("PCI") interface modules 20, and in the embodiment shown, each service processor is coupled to two such modules 20 to enable the service processors 16 to carry out all of the I/O functionality of the segment 12.

The computer system 10 further includes a serial-to-PCI interface 22 for coupling a system console 24 to at least one of the segments 12 of the computer system 10. The system console 24 is operational for enabling a user of the computer system 10 to download boot information to the computer system 10, configure devices, monitor status, and perform diagnostic functions. Regardless of how many segments 12 are configured in the computer system 10, only one system console 24 is required.

The boot device 26 (for example, a JAZ® removable disk computer mass storage device available from Iomega Corporation, Roy UT) is also coupled to the master boot service processor $16_0$ through one of the PCI modules 20. The PCI modules 20 coupled to service processors $16_1$ through $16_3$ are utilized to couple the segment 12 to all other peripheral devices such as, for example, disk arrays $28_0$ through $28_5$, any one or more of which may be replaced by, for example, an Ethernet connection.

The computer system 10 comprises sophisticated hardware and building blocks which are commodity based, with some enhancements to accommodate the uniqueness of high-performance computing ("HPC"). On the hardware side, the base unit for the computer system 10 is a segment 12. Each segment 12 contains computation and service processor 18, 16 elements, memory, power supplies, and a crossbar switch assembly. The computer system 10 is "scalable" in that an end user can configure a system that consists of from 1 to 16 interconnected segments 12. Each segment 12 contains 20 total processors: sixteen computational processors 18 and four service processors 16. In a preferred embodiment, the computational processors 18 may reside on an individual assembly that contains four processors (e.g. the Deschutes™ microprocessor available from Intel Corporation, Santa Clara, Calif.) and eight interface chips (i.e. two per computational processor 18). Each computational processor 18 has an internal processor clock rate greater than 300 MHz and a system clock speed greater than 100 MHz, and the interface chips provide the connection between the computational processors 18 and the memory switches that connect to memory as will be described and shown in greater detail hereafter.

The service processors 16 may be contained on a service processor assembly, which is responsible for all input and output for the computer system 10. Each of the service processor assemblies contain a processor (the same type as the computational processor 18), two interface chips, two 1 Mbyte I/O buffers, and two bi-directional PCI buses. Each PCI bus has a single connector. All I/O ports have DMA capability with equal priority to processors. The PCI modules 20 serve dual purposes, depending upon which service processor 16 with which they are used. The PCI connectors on the master boot service processor $16_0$ are used to connect to the boot device 26 and the system console 24. The PCI modules 20 on the regular service processors $16_1$ through $16_3$ are used for all other peripherals. Some of the supported PCI-based interconnects include small computer systems interface ("SCSI"), fiber distributed data interface ("FDDI"), high performance parallel interface ("HIPPI") and others. Each PCI bus has a corresponding commodity-based host adapter.

The separation of service functions from computing functions allows for concurrent execution of numeric processing and the servicing of operating system duties and external peripherals.

Figure 2:
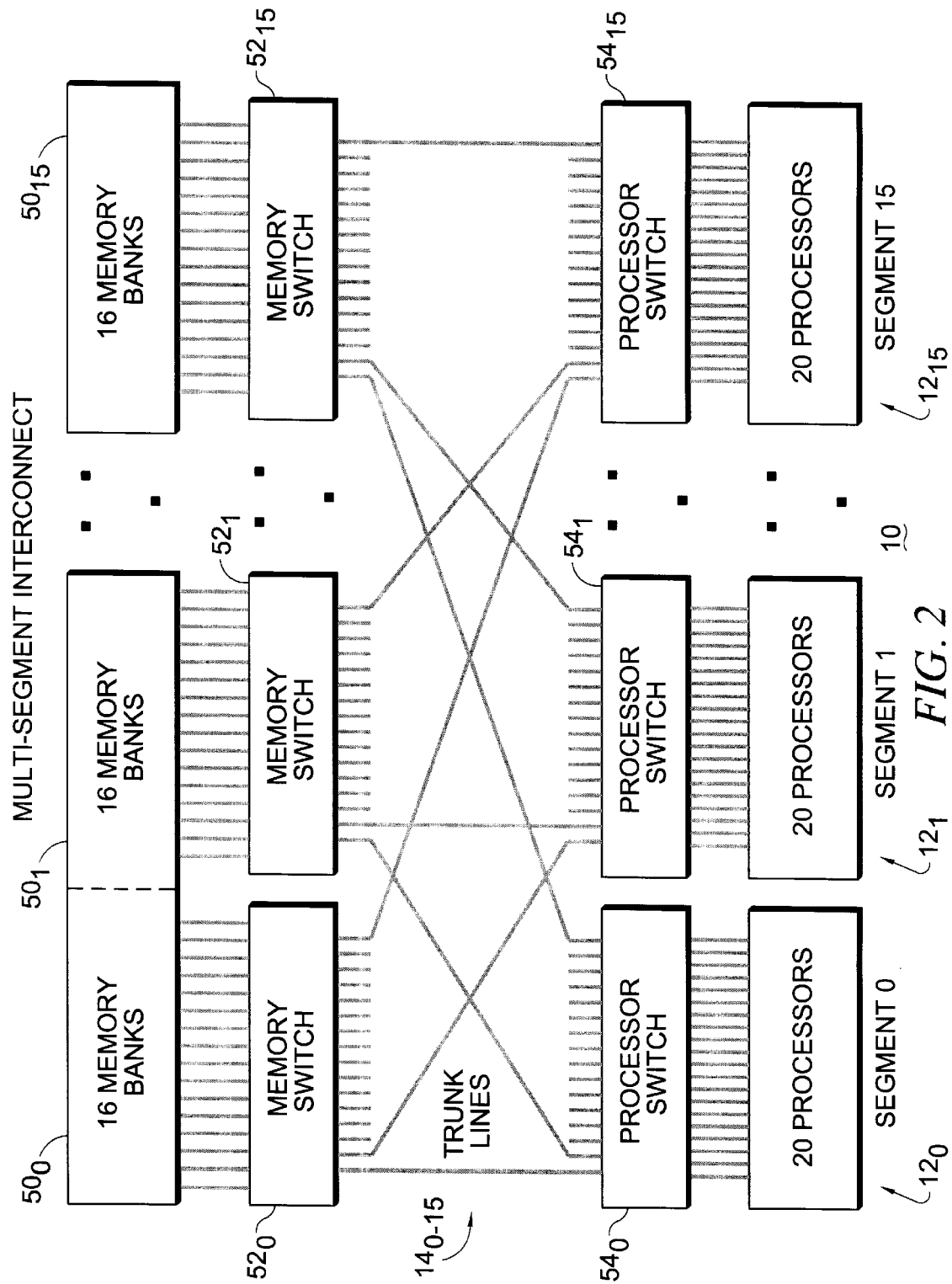
FIG. 2 is a simplified functional block diagram for the interconnect strategy for the computer system of FIGS. 1A and 1B allowing a total of three hundred twenty processors to access any of the two hundred fifty six memory banks.

With reference additionally now to FIG. 2, the interconnect strategy for the computer system 10 of FIGS. 1A and 1B is shown in greater detail in an implementation employing sixteen segments $12_0$ through $12_{15}$ interconnected by means of sixteen trunk lines $14_0$ through $14_{15}$. As shown, a number of memory banks $50_0$ through $50_{15}$, each allocated to a respective one of the computational processors $18_0$ through $18_{15}$ (resulting in sixteen memory banks 50 per segment 12 and two hundred fifty six memory banks 50 in total for a sixteen segment 12 computer system 10) form a portion of the computer system 10 and are respectively coupled to the trunk lines $14_0$ through $14_{15}$ through a like number of memory switches $52_0$ through $52_{15}$. The memory utilized in the memory banks $50_0$ through $50_{15}$ may be synchronous static random access memory ("SSRAM") or other suitable high speed memory devices. Also as shown, each of the segments $12_0$ through $12_{15}$ includes, for example, twenty processors (four service processors $16_0$ through $16_3$ and sixteen computational processors $18_0$ through $18_{15}$) coupled to the trunk lines $14_0$ through $14_{15}$ through a corresponding one of a like number of processor switches $54_0$ through $54_{15}$.

Each segment 12 interconnects to all other segments 12 through the crossbar switch. The computer system 10 crossbar switch technology enables segments 12 to have uniform memory access times across segment boundaries, as well as within the individual segment 12. It also enables the computer system 10 to employ a single memory access protocol for all the memory in the system. The crossbar switch may utilize high-speed Field Programmable Gate Arrays ("FPGAs")to provide interconnect paths between memory and the processors, regardless of where the processors and memory are physically located. This crossbar switch interconnects every segment 12 and enables the processors and memory located in different segments 12 to communicate with a uniform latency. In a preferred embodiment, each crossbar switch has a 1 clock latency per tier, which includes reconfiguration time. For a sixteen segment 12 computer system 10 utilizing three hundred and twenty processors 16, 18 only two crossbar tiers are required.

As mentioned previously, the computer system 10 may preferably utilize SSRAM for the memory banks 50 since it presents a component cycle time of 6 nanoseconds. Each memory bank 50 supports from 64 to 256 Mbytes of memory. Each computational processor 18 supports one memory bank 50, with each memory bank 50 being 256 bits wide, plus 32 parity bits for a total width of 288 bits. In addition, the memory bank 50 size may be designed to match the cache line size, resulting in a single bank access for a full cache line. Read and write memory error correction may be provided by completing parity checks on address and data packets.

The parity check for address packets may be the same for both read and write functions wherein new and old parity bits are compared to determine whether or not the memory read or write should continue or abort. When a memory "write" occurs, a parity check may be done on each of the data packets arriving in memory. Each of these data packets has an 8-bit parity code appended to it. As the data packet arrives in memory, a new 8-bit parity code is generated for the data packet and the old and new parity codes are compared. The comparison results in one of two types of codes: single bit error ("SBE") or double-bit or multi-bit error ("DBE"). The single-bit error may be corrected on the data packet before it is entered in memory. In the case of a double-bit or multi-bit error, the data packet is not written to memory, but is reported back to the processor, which retries the data packet reference. When a memory "read" occurs, each of the data packets read from memory generates an 8-bit parity code. This parity code is forwarded with the data to the processor. The processor performs single error correction and double error detection ("SECDED") on each data packet.

Figure 3:
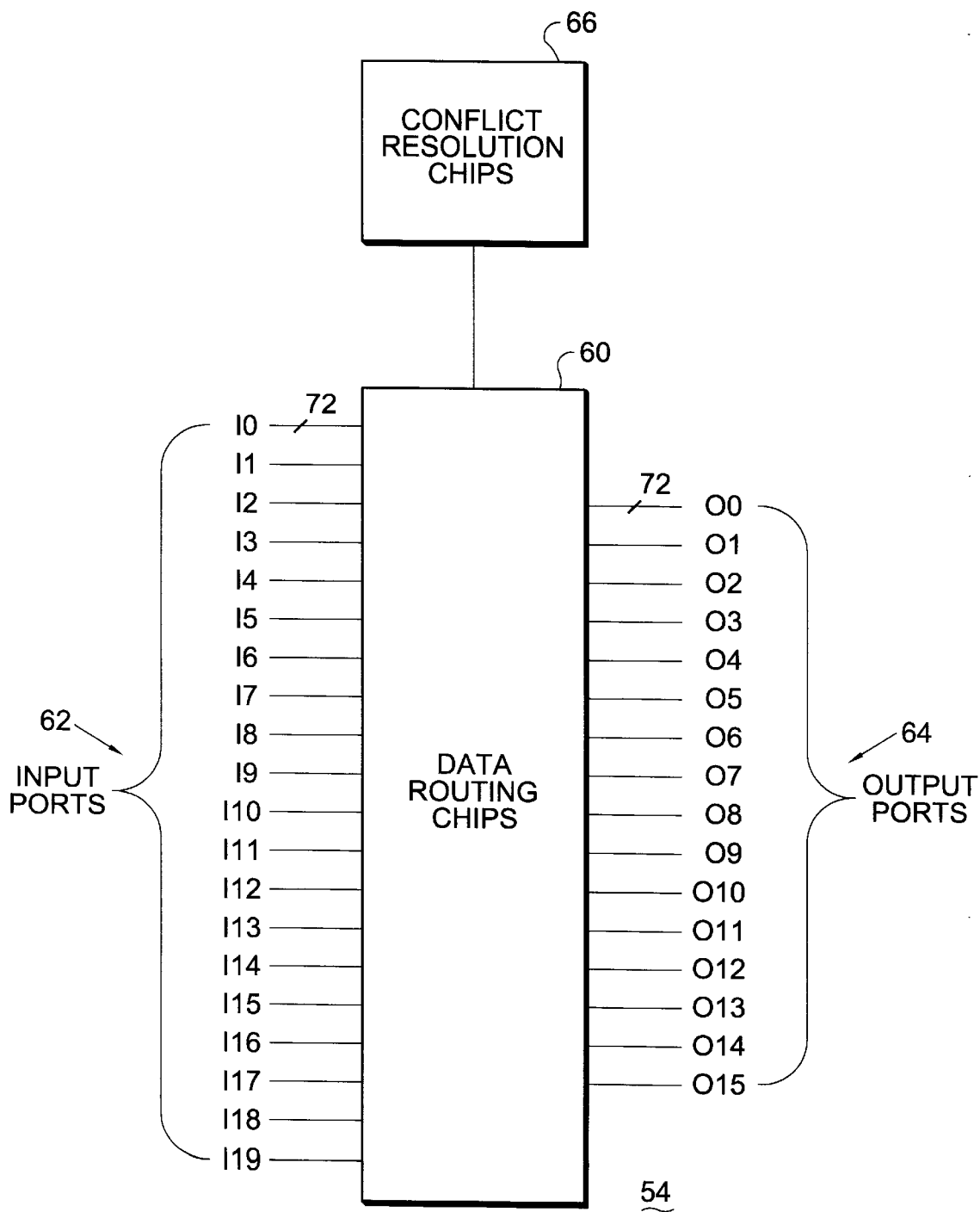
FIG. 3 is a simplified block diagram of a dynamic priority conflict resolution and data routing circuit utilized as processor switches in the interconnect strategy of FIG. 2 illustrating, for example, twenty input ports and sixteen output ports.

With reference additionally now to FIG. 3, a dynamic priority conflict resolution and data routing circuit utilized as the processor switches $54_0$ through $54_{15}$ in the interconnect strategy of the preceding figure is shown. In this exemplary illustration, a number of FPGA implemented data routing integrated circuit devices ("chips") 60 under the control of a number of conflict resolution chips 66 are utilized to interconnect twenty input ports 62 ($I_0$ through $I_{19}$) to sixteen output ports 64 ($O_0$ through $O_{15}$). As will be more fully described hereinafter, the data routing chips 60 and conflict resolution chips 66 of the processor switches 54 function to afford equal priority access to the shared memory resources (memory banks $50_0$ through $50_{15}$) by all processing devices (the twenty processors $12_0$ through $12_{15}$ of each segment of the computer system 10).

The function of the circuit shown is to resolve conflicts within the crossbar switch used to connect the processors 12 to the memory 50. The embodiment disclosed with particularity includes a switch 54 with a first plurality of input ports (e.g. 20) and a second plurality of output ports (e.g. 16). A number of these switches 54 are then cascaded into two levels to allow a total of three hundred twenty processors 12 to access any of up to two hundred fifty six memory banks 50. As stated previously, in a computer system 10 utilizing this large number of processors 12, it is necessary to ensure that all processors 12 have equal priority to access memory over time.

Figure 4:
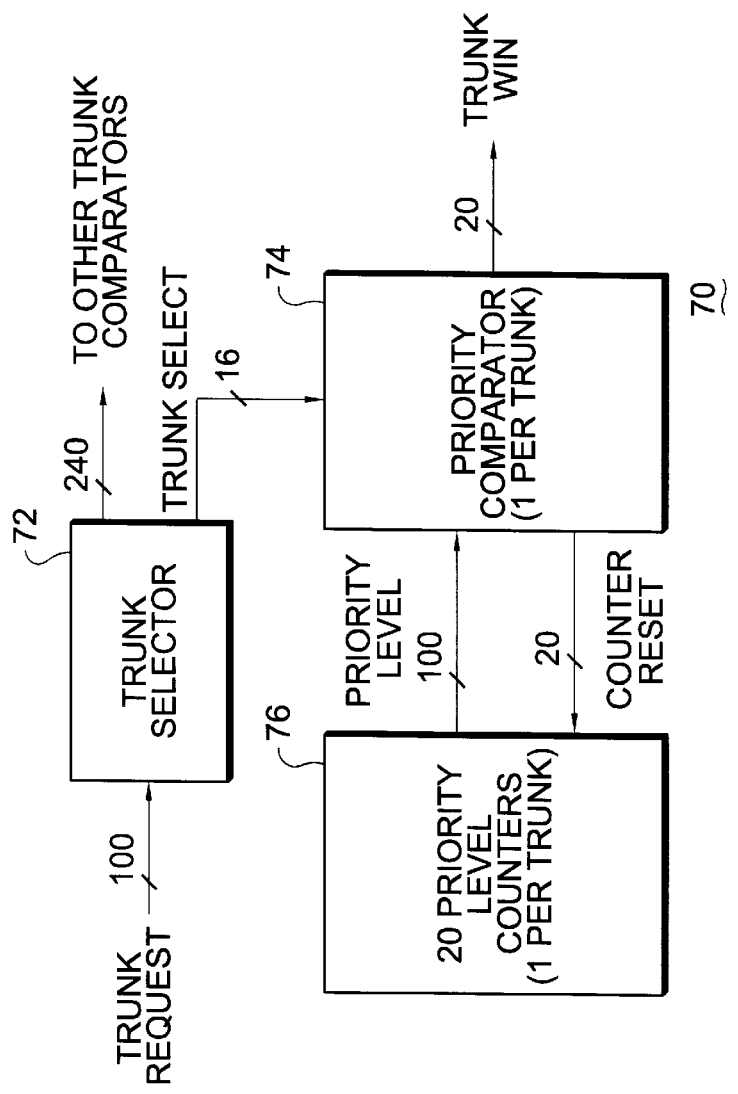
FIG. 4 is a functional block diagram of a dynamic priority conflict resolution circuit in accordance with the present invention.

With reference additionally now to FIG. 4, a functional block diagram of a dynamic priority conflict resolution circuit 70 in accordance with the present invention is shown. The conflict resolution circuit 70 includes a trunk selector 72 which receives a number of trunk requests on a one hundred line trunk request bus. The trunk selector 72 is coupled to a two hundred forty line bus to other computer system 10 trunk comparators and provides a trunk select signal on a sixteen line bus to a priority comparator 74. The priority comparator 74 is coupled to twenty priority level counters 76 (one per trunk) by means of a twenty line counter reset bus and receives a priority level signal therefrom on a hundred line bus at the output of the priority level counters 76. The priority comparator 74 produces a "trunk win" signal on a twenty line output bus as shown.

In operation, a priority level for each input port is maintained by each output port. On power up, these priority levels are predetermined in accordance with the particular computer system design. When a conflict for a particular output port occurs, the priority levels of the conflicting inputs are evaluated and access is initially granted to the highest priority input. Once this initial access is granted, the priority level of the "winning" input is then changed to the lowest priority level and the priority of all of the other inputs are each increased by one.

Through use of this technique, all inputs will transition through all of the possible priority levels based upon their usage of the output and an input that has just been given access to the output will have a low priority, whereas an input that has not recently accessed the output will have a higher priority. Inasmuch as only inputs that require access to the output are evaluated, the system always allows a useful connection. In addition, the input that has least recently used the output will be allowed access to it.

Since it is possible that an input may not want to get access to a particular output port for some time, this event will result in its priority being incremented to the highest level and remaining there. In the particular implementation disclosed, this highest level priority is the only priority level that can legitimately be held by more than one input at a time. As a consequence, a mechanism is needed to deal with a conflict between inputs that all have the highest priority level, although this same situation might also be encountered in the event of a circuit error that inappropriately assigned the same priority to two inputs.

The solution disclosed herein is to default back to the original predetermined priorities when a priority conflict occurs. This action breaks the tie and allows the circuit to continue to function as described. This, in essence, guarantees that no input will be blocked indefinitely and that the longest wait will be equal to the time duration for which access is granted, multiplied by the total number of inputs.

Figure 5A:
FIG. 5A is a functional block diagram of an input port and 4-to-16 demultiplexor.

With reference additionally now to FIG. 5A, an input port and 4-to-16 demultiplexor circuit 80 is shown comprising a 4-to-16 demultiplexor 82 coupled to receive a five line input N trunk request signal and to provide an input N trunk select signal (to the counter output enables "OE") on a sixteen line output bus. There is a demultiplexor circuit 80 for each input port.

Figure 5B:
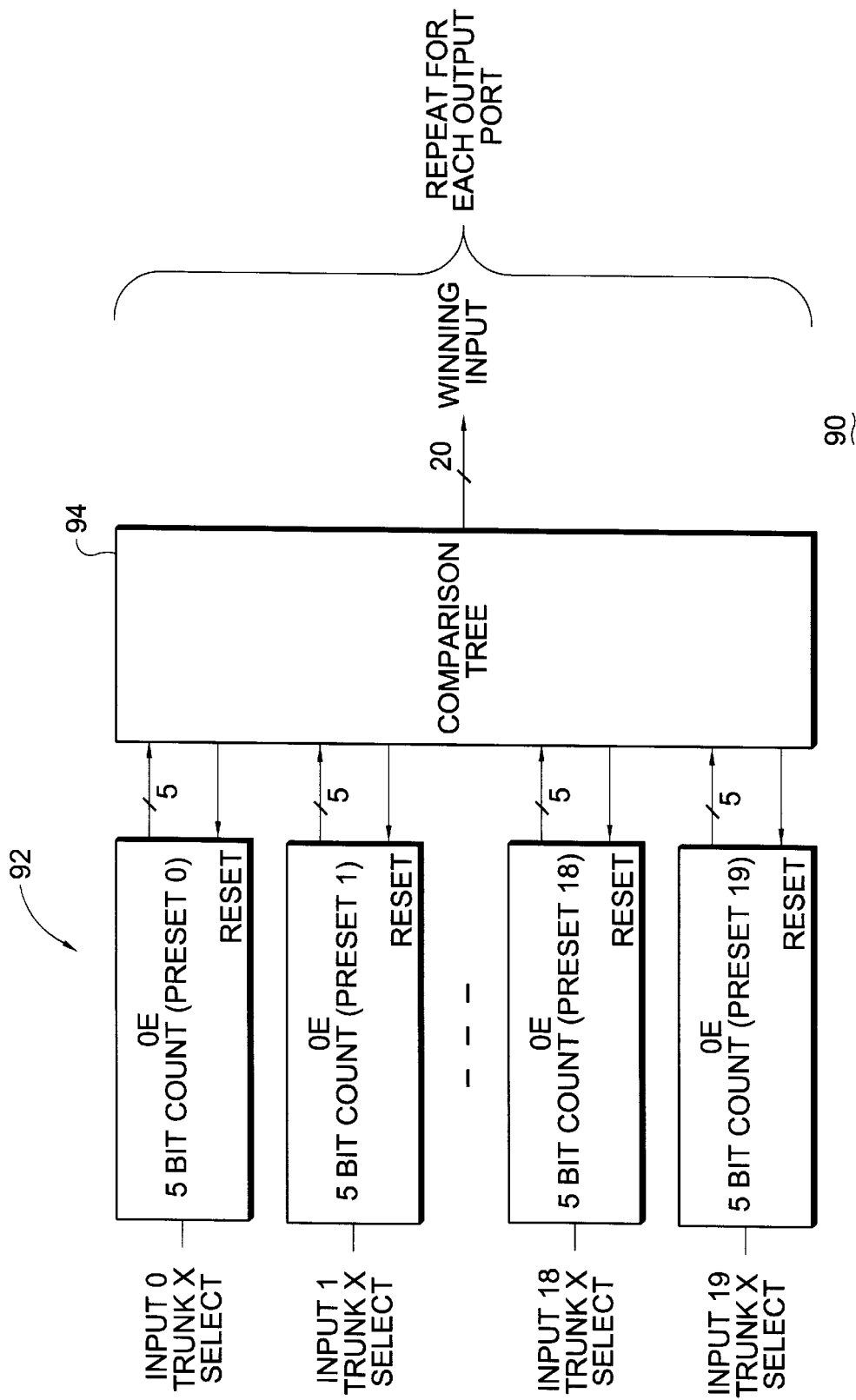
FIG. 5B is a functional block diagram of a conflict resolution circuit for use in conjunction with the system and method of the present invention.

With reference additionally now to FIG. 5B, a conflict resolution circuit 90 is shown. The conflict resolution circuit 90 includes a number of counters 92, each having a five bit count preset with values of between 0 and 19 inclusive. The five bit value of each of the counters 92 is supplied to a comparison tree 94 to produce a "winning" input signal on a twenty line output bus as well as a reset signal to each of the counters 92 as will be more fully described hereinafter. The individual counters 92 receive an input trunk select signal as shown and there is a conflict resolution circuit 90 for each output port of the computer system 10, each of which operates independently of the others.

With reference to both FIGS. 5A and 5B, each input provides a 5-bit code to the demultiplexor 82. This code consists of four bits that provide a binary representation of the desired output and one bit indicating that the request for an output is valid, with the latter bit used because an input may not desire an access to any output. With sixteen possible output selections, the four bits will always indicate a legitimate output selection and the valid bit is connected to the demultiplexor 82 enable pin. If the valid bit is activated, the demultiplexor circuit 80 will then activate one of its sixteen outputs that corresponds to the desired output port of the crossbar. With twenty input ports there will be a corresponding twenty demultiplexor circuits 80, each with one output corresponding to each output of the crossbar switch. With sixteen outputs, there are also then sixteen identical conflict resolution circuits 90. The circuit for switch output "1" will receive the first output from each of the twenty demultiplexors 82. The circuit for output "2" gets the second of the twenty outputs, and so forth through all sixteen circuits.

Each of the twenty demultiplexor circuit 80 output signals is used to enable the output of a 5-bit counter 92. These counters 92 are used to create the actual priority level for the input port with which it is associated. These counter output bits are then compared with each other to determine the "winning" input port. This comparison is done using a comparison tree circuit 94 in accordance with the criteria indicated in the following Table 1. The full comparison tree circuit equations are shown in the succeeding Table 2. By using a "greater than or equal to" comparator instead of only a "greater than" comparator, ties between identical priorities are automatically resolved. This eliminates the need to add additional circuitry and time to detect and resolve ties as mentioned previously.

The outputs from these comparators are logically combined as shown to create one active output from a field of twenty possible outputs. One output is associated with each switch input and will only become active if that input is the one granted access to the switch output.

On power up, the counters 92 are each preset to a unique output value. These represent the twenty preset values described previously. When a particular counter 92 contains the "winning" priority, it is reset to a zero output. All other counters 92 are incremented. Once a count of "20" is reached, no further increments are issued to that counter 92. This action allows for an input to achieve a high priority level and hold it until it wants to connect to a particular output. At that point, it will "win" access very quickly, although relatively wide counters and comparators are required.

TABLE 1

| Full Comparison Tree Circuit | | | | | | | | | | |
|---|---|---|---|---|---|---|---|---|---|---|
| = | xA | xB | xC | xD | xE | xF | xG | xH | xI | xJ |
| Ax | $I0 \geq I1$ | $I0 \geq I2$ | $I0 \geq I3$ | $I0 \geq I4$ | $I0 \geq I5$ | $I0 \geq I6$ | $I0 \geq I7$ | $I0 \geq I8$ | $I0 \geq I9$ | $I0 \geq I10$ |
| Bx | $I1 \geq I2$ | $I1 \geq I3$ | $I1 \geq I4$ | $I1 \geq I5$ | $I1 \geq I6$ | $I1 \geq I7$ | $I1 \geq I8$ | $I1 \geq I9$ | $I1 \geq I10$ | $I1 \geq I11$ |
| Cx | $I2 \geq I3$ | $I2 \geq I4$ | $I2 \geq I5$ | $I2 \geq I6$ | $I2 \geq I7$ | $I2 \geq I8$ | $I2 \geq I9$ | $I2 \geq I10$ | $I2 \geq I11$ | $I2 \geq I12$ |
| Dx | $I3 \geq I4$ | $I3 \geq I5$ | $I3 \geq I6$ | $I3 \geq I7$ | $I3 \geq I8$ | $I3 \geq I9$ | $I3 \geq I10$ | $I3 \geq I11$ | $I3 \geq I12$ | $I3 \geq I13$ |
| Ex | $I4 \geq I5$ | $I4 \geq I6$ | $I4 \geq I7$ | $I4 \geq I8$ | $I4 \geq I9$ | $I4 \geq I10$ | $I4 \geq I11$ | $I4 \geq I12$ | $I4 \geq I13$ | $I4 \geq I14$ |
| Fx | $I5 \geq I6$ | $I5 \geq I7$ | $I5 \geq I8$ | $I5 \geq I9$ | $I5 \geq I10$ | $I5 \geq I11$ | $I5 \geq I12$ | $I5 \geq I13$ | $I5 \geq I14$ | $I5 \geq I15$ |
| Gx | $I6 \geq I7$ | $I6 \geq I8$ | $I6 \geq I9$ | $I6 \geq I10$ | $I6 \geq I11$ | $I6 \geq I12$ | $I6 \geq I13$ | $I6 \geq I14$ | $I6 \geq I15$ | $I6 \geq I16$ |
| Hx | $I7 \geq I8$ | $I7 \geq I9$ | $I7 \geq I10$ | $I7 \geq I11$ | $I7 \geq I12$ | $I7 \geq I13$ | $I7 \geq I14$ | $I7 \geq I15$ | $I7 \geq I16$ | $I7 \geq I17$ |
| Ix | $I8 \geq I9$ | $I8 \geq I10$ | $I8 \geq I11$ | $I8 \geq I12$ | $I8 \geq I13$ | $I8 \geq I14$ | $I8 \geq I15$ | $I8 \geq I16$ | $I8 \geq I17$ | $I8 \geq I18$ |
| Jx | $I9 \geq I10$ | $I9 \geq I11$ | $I9 \geq I12$ | $I9 \geq I13$ | $I9 \geq I14$ | $I9 \geq I15$ | $I9 \geq I16$ | $I9 \geq I17$ | $I9 \geq I18$ | $I9 \geq I19$ |
| Kx | $I10 \geq I11$ | $I10 \geq I12$ | $I10 \geq I13$ | $I10 \geq I14$ | $I10 \geq I15$ | $I10 \geq I16$ | $I10 \geq I17$ | $I10 \geq I18$ | $I10 \geq I19$ | |
| Lx | $I11 \geq I12$ | $I11 \geq I13$ | $I11 \geq I14$ | $I11 \geq I15$ | $I11 \geq I16$ | $I11 \geq I17$ | $I11 \geq I18$ | $I11 \geq I19$ | | |
| Mx | $I12 \geq I13$ | $I12 \geq I14$ | $I12 \geq I15$ | $I12 \geq I16$ | $I12 \geq I17$ | $I12 \geq I18$ | $I12 \geq I19$ | | | |
| Nx | $I13 \geq I14$ | $I13 \geq I15$ | $I13 \geq I16$ | $I13 \geq I17$ | $I13 \geq I18$ | $I13 \geq I19$ | | | | |
| Ox | $I14 \geq I15$ | $I14 \geq I16$ | $I14 \geq I17$ | $I14 \geq I18$ | $I14 \geq I19$ | | | | | |
| Px | $I15 \geq I16$ | $I15 \geq I17$ | $I15 \geq I18$ | $I15 \geq I19$ | | | | | | |
| Qx | $I16 \geq I17$ | $I16 \geq I18$ | $I16 \geq I19$ | | | | | | | |
| Rx | $I17 \geq I18$ | $I17 \geq I19$ | | | | | | | | |
| Sx | $I18 \geq I19$ | | | | | | | | | |

| = | xK | xL | xM | xN | xO | xP | xQ | xR | xS |
|---|---|---|---|---|---|---|---|---|---|
| Ax | $I0 \geq I11$ | $I0 \geq I12$ | $I0 \geq I13$ | $I0 \geq I14$ | $I0 \geq I15$ | $I0 \geq I16$ | $I0 \geq I17$ | $I0 \geq I18$ | $I0 \geq I19$ |
| Bx | $I1 \geq I12$ | $I1 \geq I13$ | $I1 \geq I14$ | $I1 \geq I15$ | $I1 \geq I16$ | $I1 \geq I17$ | $I1 \geq I18$ | $I1 \geq I19$ | |
| Cx | $I2 \geq I13$ | $I2 \geq I14$ | $I2 \geq I15$ | $I2 \geq I16$ | $I2 \geq I17$ | $I2 \geq I18$ | $I2 \geq I19$ | | |
| Dx | $I3 \geq I14$ | $I3 \geq I15$ | $I3 \geq I16$ | $I3 \geq I17$ | $I3 \geq I18$ | $I3 \geq I19$ | | | |
| Ex | $I4 \geq I15$ | $I4 \geq I16$ | $I4 \geq I17$ | $I4 \geq I18$ | $I4 \geq I19$ | | | | |
| Fx | $I5 \geq I16$ | $I5 \geq I17$ | $I5 \geq I18$ | $I5 \geq I19$ | | | | | |

TABLE 1-continued

Full Comparison Tree Circuit

```
Gx   I6 ≥ I17   I6 ≥ I18   I6 ≥ I19
Hx   I7 ≥ I18   I7 ≥ I19
Ix   I8 ≥ I19
Jx
Kx
Lx
Mx
Nx
Ox
Px
Qx
Rx
Sx
```

Examples:
AA = I0 ≥ I1
AB = I0 ≥ I2

TABLE 2

Full Comparison Equations

WINI0  = AA*AB*AC*AD*AE*AF*AG*AH*AI*AJ*AK*AL*AM*AN*AO*AP*AQ*AR*AS
WINI1  = ~AA*BA*BB*BC*BD*BE*BF*BG*BH*BI*BJ*BK*BL*BM*BN*BO*BP*BQ*BR
WINI2  = ~AB*~BA*CA*CB*CC*CD*CE*CF*CG*CH*CI*CJ*CK*CL*CM*CN*CO*CP*CQ
WINI3  = ~AC*~BB*~CA*DA*DB*DC*DD*DE*DF*DG*DH*DI*DJ*DK*DL*DM*DN*DO*DP
WINI4  = ~AD*~BC*~CB*~DA*EA*EB*EC*ED*EE*EF*EG*EH*EI*EJ*EK*EL*EM*EN*EO
WINI5  = ~AE*~BD*~CC*~DB*~EA*FA*FB*FC*FD*FE*FF*FG*FH*FI*FJ*FK*FL*FM*FN
WINI6  = ~AF*~BE*~CD*~DC*~EB*~FA*GA*GV*GC*GD*GE*GF*GG*GH*GI*GJ*GK*GL*GM
WINI7  = ~AG*~BF*~CE*~DD*~EC*~FB*~GA*HA*HB*HC*HD*HE*HF*HH*HH*HI*HJ*HK*HL
WINI8  = ~AH*~BG*~CF*~DE*~ED*~FC*~GB*~HA*IA*IB*IC*ID*IE*IF*II*II*IJ*IK
WINI9  = ~AI*~BH*~CG*~DF*~EE*~FD*~GC*~HB*~IA*JA*JB*JC*JD*JE*JF*JG*JH*JI*JJ
WINI10 = ~AJ*~BI*~CH*~DG*~EF*~FE*~GD*~HC*~IB*~JA*KA*KB*KC*KD*KE*KF*KG*KH*KI
WINI11 = ~AK*~BJ*~CI*~DH*~EG*~FF*~GE*~HD*~IC*~JB*~KA*LA*LB*LC*LD*LE*LF*LG*LH
WINI12 = ~AL*~BK*~CJ*~DI*~EH*~FG*~GF*~HE*~ID*~JC*~KB*~LA*MA*MB*MC*MD*ME*MF*MG
WINI13 = ~AM*~BL*~CK*~DJ*~EI*~FH*~GG*~HF*~IE*~JD*~KC*~LA*~MA*NA*NB*NC*ND*NE*NF
WINI14 = ~AN*~BM*~CL*~DK*~EJ*~FI*~GH*~HG*~IF*~JE*~KD*~LA*~MB*~NA*OA*OB*OC*OD*OE
WINI15 = ~AO*~BN*~CM*~DL*~EK*~FJ*~GI*~HH*~IG*~JF*~KE*~LA*~MC*~NB*~OA*PA*PB*PC*PD
WINI16 = ~AP*~BO*~CN*~DM*~EL*~FK*~GJ*~HI*~IH*~JG*~KF*~LA*~MC*~NB*~OA*~PA*QA*QB*QC
WINI17 = ~AQ*~BP*~CO*~DN*~EM*~FL*~GK*~HJ*~II*~JH*~KG*~LA*~MC*~NB*~OA*~PA*~QA*RA*RB
WINI18 = ~AR*~BQ*~CP*~DO*~EN*~FM*~GL*~HK*~IJ*~JI*~KH*~LA~MC*~NB*~OA*~PA*~QA*~RA*SA

A slightly modified approach might also be utilized which greatly improves this situation, at the expense of a small amount of the priority equalization scheme. The following Tables 3 and 4 show this modified and presently preferred approach. This technique is distinguished by the fact that all twenty counter outputs are compared concurrently as five groups of four counters 92 each. This results in five potential "winners". Another comparison then evaluates the priority level of each of the five groups. This result is then used to select the priority input from one of the five groups as the final "winner".

In the application shown and described, the counters used in the five groups may be reduced from five bits to two bits. The new counters used to select the group add an additional five, 3-bit counters. This is a reduction from one hundred to ninety counter bits. In addition, the comparators are altered from a total of nine hundred fifty bits of comparison to forty bits.

TABLE 3

Dynamic Priority Conflict Resolution Application

| ≥ | I1 | I2 | I3 | I4 | I5 | I6 | I7 | I8 | I9 | I10 | I11 | I12 | I13 | I14 | I15 | I16 | I17 | I18 | I19 |
|---|----|----|----|----|----|----|----|----|----|-----|-----|-----|-----|-----|-----|-----|-----|-----|-----|
| I0 | A0 | A1 | A2 | | | | | | | | | | | | | | | | |
| I1 |    | A3 | A4 | | | | | | | | | | | | | | | | |
| I2 |    |    | A5 | | | | | | | | | | | | | | | | |
| I3 |    |    |    | | | | | | | | | | | | | | | | |
| I4 |    |    |    | | B0 | B1 | B2 | | | | | | | | | | | | |
| I5 |    |    |    | |    | B3 | B4 | | | | | | | | | | | | |
| I6 |    |    |    | |    |    | B5 | | | | | | | | | | | | |

TABLE 3-continued

| | | | | | | | | | | | | | | | |
|---|---|---|---|---|---|---|---|---|---|---|---|---|---|---|---|
| I7 | | | | | | | | | | | | | | | |
| I8 | | | | C0 | C1 | C2 | | | | | | | | | |
| I9 | | | | | C3 | C4 | | | | | | | | | |
| I10 | | | | | | C5 | | | | | | | | | |
| I11 | | | | | | | | | | | | | | | |
| I12 | | | | | | | | D0 | D1 | D2 | | | | | |
| I13 | | | | | | | | | D3 | D4 | | | | | |
| I14 | | | | | | | | | | D5 | | | | | |
| I15 | | | | | | | | | | | | | | | |
| I16 | | | | | | | | | | | | E0 | E1 | E2 | |
| I17 | | | | | | | | | | | | | E3 | E4 | |
| I18 | | | | | | | | | | | | | | E5 | |
| ≥ | G1 | G2 | G3 | G4 | | | | | | | | | | | |
| G0 | F0 | F1 | F2 | F3 | | | | | | | | | | | |
| G1 | | F4 | F5 | F6 | | | | | | | | | | | |
| G2 | | | F7 | F8 | | | | | | | | | | | |
| G3 | | | | F9 | | | | | | | | | | | |

Examples:
IO ≥ I1 = A0
IP ≥ I2 = A1

TABLE 4

Dynamic Priority Conflict Resolution Equations

WINI0 = A0*A1*A2*F0*F1*F2*F3
WINI1 = ~A0*A3*A4*F0*F1*F2*F3
WINI2 = ~A1*~A3*A5*F0*F1*F2*F3
WINI3 = ~A2*~A4*~A5*F0*F1*F2*F3
WINI4 = B0*B1*B2*~F0*F4*F5*F6
WINI5 = ~B0*B3*B4*~F0*F4*F5*F6
WINI6 = ~B1*~B3*B5*~F0*F4*F5*F6
WINI7 = ~B2*~B4*B5*~F0*F4*F5*F6
WINI8 = C0*C1*C2*~F1*F7*F8
WINI9 = ~C0*C3*C4*~F1*~F4*F7*F8
WINI10 = ~C1*~C3*C5*~F1*~F4*F7*F8
WINI11 = ~C2*~C4*~C5*~F1*~F4*F7*F8
WINI12 = D0*D1*D2*~F2*~F5*~F7*F9
WINI13 = ~D0*D3*D4*~F2*~F5*~F7*F9
WINI14 = D1*~D3*D5*~F2*~F5*~F7*F9
WINI15 = ~D2*~D4*~D5*~F2*~F5*~F7*F9
WINI16 = E0*D1*D2*~F3*~F6*~F8*~F9
WINI17 = ~D0*E3*D4*~F3*~F6*~F8*~F9
WINI18 = ~E1*~E3*E5*~F3*~F6*~F8*~F9
WINI19 = ~E2*~E4*~E5*~F3*~F6*~F8*~F9

While there have been described above the principles of the present invention in conjunction with specific a specific multi-processor computer architecture it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

What is claimed is:

1. A computer system including a plurality of processing elements requiring access to a shared memory resource, said computer system comprising:

a priority conflict resolution circuit for controlling access to said memory resource among said processing elements, said priority conflict resolution circuit including a predetermined differing initial priority assigned corresponding to each of said plurality of said processing elements and wherein upon a selected one of said plurality of said processing elements being afforded access to said memory resource based upon said initial priority thereof being a highest priority, said initial priority of said selected one of said plurality of said processing elements is changed to a lowest priority and said priority of all others of said plurality of said processing elements is incremented to a next higher priority, the all others of said plurality of said processing elements incrementable to the next higher priority thereof until a common highest priority is reached, and wherein said priority of said subset of said processing elements default to said differing initial priorities thereof.

2. The computer system of claim 1 wherein said priority conflict resolution circuit comprises a comparator to dynamically correct erroneous priorities among said plurality of processing elements.

3. The computer system of claim 2 wherein said comparator is operative to implement a greater-than-or-equal-to function to correct said erroneous priorities.

4. The computer system of claim 1 wherein said priority conflict resolution circuit comprises a comparator to dynamically resolve priority ties among said plurality of processing elements the priority ties resulting from more than one of said plurality of processing elements incremented to be of the common highest priority.

5. The computer system of claim 1 wherein said initial priority assigned corresponding to each of said plurality of said processing elements is maintained by each output port of said dynamic priority conflict resolution circuit.

6. The computer system of claim 1 wherein said dynamic priority conflict resolution circuit comprises a first plurality of input ports and a second plurality of output ports coupled through a number of data routing resources.

7. The computer system of claim 6 wherein said data routing resources are operatively controlled by a number of conflict resolution resources.

8. The computer system of claim 6 comprising twenty input ports and sixteen output ports.

9. A method for dynamic priority conflict resolution in a computer system including a plurality of processing elements and a shared memory resource, said method comprising the steps of:

assigning a predetermined differing initial priority corresponding to each of said plurality of processing elements;

affording access to said memory resource to a requesting one of said plurality of processing elements having a highest initial priority thereof;

reducing said initial priority of said requesting one of said plurality of processing elements afforded access to said memory resource to a lowest priority thereof;

incrementing said priority of each remaining one of said plurality of processing elements to a next higher priority, each remaining one of said plurality of processing elements incrementable until a common highest priority is reached; and defaulting said priority of a subset of each remaining one of said plurality of processing elements which have been incremented to a common highest priority thereof to said predetermined differing initial priorities thereof.

10. The method of claim 9 wherein said steps of affording access, reducing and incrementing are carried out by a priority conflict resolution circuit.

11. The method of claim 9 further comprising the steps of:
comparing priorities among said plurality of processing elements; and
dynamically correcting erroneous priorities among said plurality of processing elements.

12. The method of claim 11 wherein said step of comparing is carried out by a greater-than-or-equal-to function to correct said erroneous priorities.

13. The method of claim 9 further comprising the steps of:
comparing priorities among said plurality of processing elements; and
dynamically resolving priority ties among said plurality of processing elements, the priority ties resulting from more than one of said plurality of processing elements incremented to be of the common highest priority.

14. The method of claim 10 further comprising the step of:
maintaining said initial priority assigned corresponding to each of said plurality of said processing elements at a respective output port of said priority conflict resolution circuit.

* * * * *